United States Patent [19]

Anderson

[11] 4,373,783
[45] Feb. 15, 1983

[54] THERMALLY STABILIZED HELIOSTAT

[75] Inventor: Alfred J. Anderson, Littleton, Colo.

[73] Assignee: Atlantic Richfield Company, Los Angeles, Calif.

[21] Appl. No.: 138,207

[22] Filed: Apr. 7, 1980

[51] Int. Cl.³ .............................................. G02B 5/08
[52] U.S. Cl. .................................. 350/310; 126/438; 350/292
[58] Field of Search ....................... 350/292, 299, 310; 353/3; 126/438

[56] References Cited

U.S. PATENT DOCUMENTS

| | | | |
|---|---|---|---|
| 3,600,257 | 8/1971 | Reinhardt | 350/310 X |
| 3,906,927 | 9/1975 | Caplan | 350/310 X |
| 4,245,895 | 1/1981 | Wildenrotter | 350/310 |

FOREIGN PATENT DOCUMENTS

| | | | |
|---|---|---|---|
| 2738665 | 3/1979 | Fed. Rep. of Germany | 350/310 |
| 52-29748 | 3/1977 | Japan | 350/310 |
| 675015 | 7/1979 | U.S.S.R. | 350/310 |

Primary Examiner—F. L. Evans
Attorney, Agent, or Firm—James C. Fails

[57] ABSTRACT

An improvement in a heliostat having a main support structure and pivoting and tilting motors and gears and a mirror module for reflecting solar energy onto a collector, the improvement being characterized by an internal support structure within each mirror module and front and back sheets attached to the internal support structure, the front and back sheets having the same coefficient of thermal expansion such that no curvature is induced by temperature change, and a layer of adhesive adhering the mirror to the front sheet. The adhesive is water repellent and has adequate set strength to support the mirror but has sufficient shear tolerance to permit the differential expansion of the mirror and the front sheet without inducing stresses or currature effect. The adhesive also serves to dampen fluttering of the mirror and to protect the mirror backside against the adverse effects of weather. Also disclosed are specific details of the preferred embodiment.

9 Claims, 6 Drawing Figures

THERMALLY STABILIZED HELIOSTAT

The government has rights in this invention pursuant to contract number MDH83-2729E awarded by the U.S. Department of Energy.

FIELD OF THE INVENTION

This invention relates to heliostats. More particularly, it relates to a thermally stabilized heliostat for reflecting solar energy onto a remote collector, the heliostat resisting curvature induced by temperature change.

DESCRIPTION OF THE PRIOR ART

With the increased cost and scarcity of fossil fuels and other energy sources, much work is being done to try to use solar energy. In employing solar energy, a plurality of heliostats reflect the solar energy onto a remote collector.

Typical of such systems are those described in U.S. Patents. For example, U.S. Pat. No. 3,905,352 lists some fourteen earlier patents ranging from U.S. Pat. No. 260,657 through U.S. Pat. No. 3,469,837 and, itself, describes a system for collecting and transferring useable solar heat by reflecting the sun from heliostats on an elevated platform into a central receiving station.

U.S. Pat. No. 3,892,433, inventor Floyd A. Blake, describes a direct solar hydroelectric integrated system and concentrating heliostats for this system. U.S. Pat. No. 3,924,604 describes a solar energy conversion system in which pivotally mounted pads reflected energy onto an elevated tower collector.

Initially the heliostats were large strucutral elements with high costs per unit area. As larger total area of reflecting surface became needed, much research was put into trying to reduce the cost per unit area. This resulted in using materials such as plastic foam adhered onto a steel backing and a mirror front. While this did reduce costs significantly, it introduced a thermal error in which differential expansion of the materials as the temperature changed caused a bowing of the mirror module. This made difficult keeping the mirror module focused onto the collector so as to most efficiently use the sun's energy by the collector.

In all of the prior art attempts to solve this problem have resulted in intolerably increasing the cost of the mirror modules above about $2.40 per square foot.

Thus it can be seen that the prior art has not been successful in solving the problem of thermally induced curvature, yet maintaining economical mirror modules.

SUMMARY OF THE INVENTION

Accordingly, it is an object of this invention to provide economical mirror modules for use in heliostats; simultaneously solving the problem of thermal induced curvature yet having an economical mirror module.

It is a specific object of this invention to provide an improvement in a heliostat for effecting solar energy onto a collector, the improvement being characterized by mirror modules that were economical and yet did not suffer the defect of having curvature introduced by a temperature change.

These and other objects will become apparent from the descriptive matter hereinafter, particularly when taken in conjunction with the appended drawings.

In accordance with this invention there is provided an improvement in a heliostat for reflecting solar energy onto a collector and including a main support structure; a means for pivoting and tilting the heliostat so as to keep the solar energy focused on the collector; and a plurality of mirror modules for reflecting the solar energy onto the collector, the improvement comprising having each mirror module thermally stabilized against curvature induced by temperature changes and comprising:

a. internal support structure having sufficient rigidity to support the mirror cantilevered from the main support structure and to withstand predetermined loads;
b. front and back sheets attached to the internal support structure; the front and back sheets having the same co-efficient of thermal expansion such that no curvature is induced by temperature changes; the front and back sheets having adequate structural strength to stabilize the internal support structure; and
c. a layer of grease (organic or inorganic) for adhering the mirror to the front sheet; the grease being water repellent and providing adequate capillary and ambient pressure forces to support the mirror and having sufficient shear tolerance to permit differential expansion of the mirror and the front sheet when the temperature changes, the grease being adapted to prevent fluttering of the mirror with respect to the front sheet and to protect the mirror backside against the adverse effects of weather.

DESCRIPTION OF PREFERRED EMBODIMENTS

Figure 2:
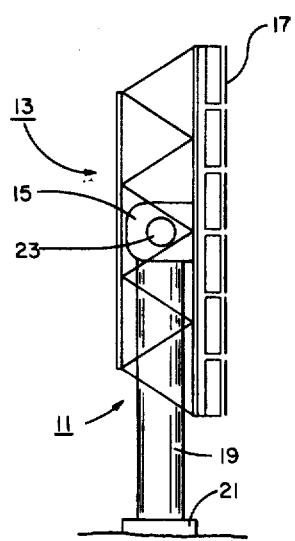
FIG. 2 is a side elevational view of the heliostat of FIG. 1.
Figure 1:
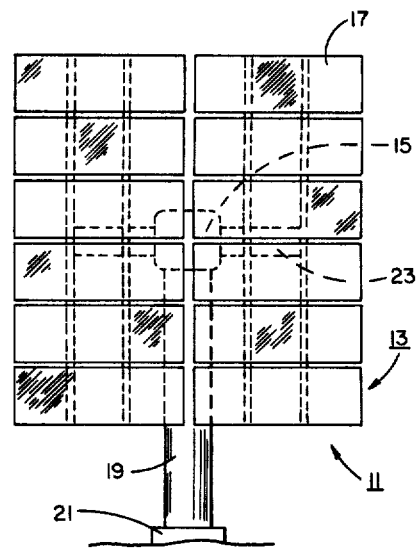
FIG. 1 is a front plan view of a heliostat in accordance with an embodiment of this invention.
Figure 5:
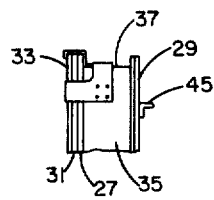
FIGS. 5 and 6 are respective partial side and top views showing corners details when employing C-beams.

As indicated hereinbefore, the usual solar system includes a collector for receiving and using the radiant energy from the sun. The solar system also includes a plurality of reflectors, or heliostats, for reflecting the suns radiant energy onto the collector. Ordinarily, in the prior art, the collector was supported on a tower to facilitate receiving the radiant energy from a plurality of reflector means spaced about the collector. For example, where a plurality of three or more rows of the respective reflectors, or heliostats, were employed, the tower was at least 100 feet high, or higher. Usually it was about 200 feet high.

In the prior art, the collector was a steam generator by heating water to produce steam or photovoltaic cells to produce electricity directly. Other type collectors can be employed and it is immaterial to this invention as to the nature of the collector. For example, where water was converted to steam, the steam was passed through turbines rotating generators generating electricity. If desired, the collector may absorb the radiant energy to convert it to heat for heating oil or other high boiling liquid that will be passed in heat exchange relationship with water or the like.

The nature of the towers is immaterial to this invention.

Ordinarily, respective sensors are disclosed between the heliostats and the target collector to detect and control alignment of the reflected beams and insure that all of the sunlight is reflected onto the collector by the heliostat, and the most efficient use is made of the sunlight available. These type of sensors are well known in the art and need not be described herein.

As implied from the foregoing, the heliostat and the remainder of the solar systems were frequently located in terrain experiencing wide diurnal and seasonal temperature variations. These temperature variations induced differential thermal expansion between the mirror and supporting substrate and resulted in thermal stresses and curvature effects which degrade the reflected solar image. In addition, day-night temperature and humidity fluctuations often resulted in the condensation of water vapor between the mirror and substrate which in turn lead to mirror damage.

In accordance with this invention, the heliostats alleviate these problems.

Referring to FIGS. 1-4, there is illustrated a heliostat 11 in accordance with an embodiment of this invention. The heliostat 11 includes a main support structure 13, FIGS. 1 and 2, and means 15 for pivoting and tilting a plurality of mirror modules 17.

The main support structure 13 includes a vertical support such as post 19 embedded in a foundation 21, such as concrete. The post 19 is ordinarily of steel pipe or the like. As will be apparent, any support structure adequate to withstand the loads imposed will be satisfactory.

The means 15 comprises the usual combination of motors, gears and pinions for rotating the heliostat with respect to the vertical axis of the post 19 and for rotating horizontal extending arms 23 and, hence, tilting the base of the heliostat, including mirror modules 17. As illustrated, the heliostat may be fastened in the vertical or horizontal position for being stored over the night, during windstorms and the like. Suitable fastening means such as latches or the like can be employed to augment and take the strain off the means 15 for pivoting and tilting the heliostat. The means 15 pivots and tilts the heliostat to keep the solar energy focused on the collector. This focusing may be done from respective sensors as indicated. On the other hand, if desired, means may be tied into a calculator, with or without having a response fed from a sensor, to maintain the reflected beam focused onto the collector. The system employed is relatively immaterial to this invention.

As indicated hereinbefore, this invention is concerned with a mirror module being firmly stabilized against curvature induced by temperature changes. The respective mirror modules 17, FIGS. 3-6, include an internal support structure 25, front and back sheets 27, 29 and a layer of silicone grease 31 slidably holding the mirror 33 to the front sheet 27.

The internal support structure has sufficient rigidity to support the mirror 33 cantilevered from the main support structure 13 and to withstand predetermined loads. By predetermined loads is meant structural loads induced by the weight of the materials, by wind, by snow, by ice and the like. As illustrated, the internal structure includes a plurality of beams extending either directionally coincident or transversely of the mirror. Expressed otherwise, the beams 35 extend vertically in the heliostat 11 of FIG. 1 where the longitudinal dimension of the mirror are disposed horizontally or may be in a perpendicular direction. The beams may comprise C-beams, Z-beams, I-beams, continuous plastic foam slabs or the like. It has been found advantageous to employ the Z-beams, FIGS. 3 and 4, or C-beams, FIGS. 5 and 6; since the beams can be formed readily and readily adhered, as by soldering, adhering or the like, to the respective front and back sheets 27, 29.

The front and back sheets 27 and 29 have the same coefficient of thermal expansion such that no curvature is induced into the mirror module by temperature changes even if the internal beams are of a dissimilar material. The front and back sheets 27 and 29 have adequate structural strength to stabilize the internal support structure 25. Expressed otherwise, the front and back sheets 27 and 29 are rigidly affixed to the beams 35. As illustrated, the front and back sheets may be soldered, bradded, adhered, or otherwise affixed to the internal support structure. If bradded, the heads are preferably indented such that a flat front sheet is provided for affixing the mirror as described later hereinafter. Preferably, the front and back sheets are adhered to the beams with an adhesive material. Typical of the adhesives that are employed are the polyacrylic adhesives such as Versilok 201 available from Hughson Chemical Division of the Lord Corporation, Erie, Pennsylvania. As is recognized, these polyacrylics set up and adhere when they are subjected to an accelerator which is also commercially available. Typical of these accelerators are the amines such as N, N-dimethyl-para-toluidine and N, N-dimethylaniline. On the other hand, there are other adhesives such as epoxy resins that may be employed with accelerators such as cobalt napthenate alone or in conjunction with methyl ethyl ketone peroxide catalyst.

Sources are DuPont, Wilmington, Delaware; Dow Chemical Company, Midland, Michigan; Shell Chemical Company, Houston, Texas; Rome and Hauss Chemical Company, St. Louis, Missouri; Hughson Chemical, Erie, Pennsylvania.

The respective materials of constructions for the front and back sheets 27 and 29 are the same. The internal support structure material may be of the same or a different material. As illustrated, they are formed of sheet metal such as galvanized steel. Other materials may be employed. For example, aluminum sheet members may be employed which have the same coefficient of thermal expansion. Other exotic materials of construction; such as brass, titanium, and even plastic; may be employed if desired, although ordinarily not necessary in this art.

Figure 3:
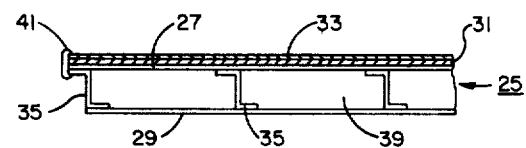
FIG. 3 is a partial cross sectional view of the mirror modules of FIG. 1, looking from the top.
Figure 6:
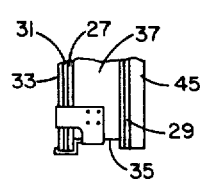
Figure 4:
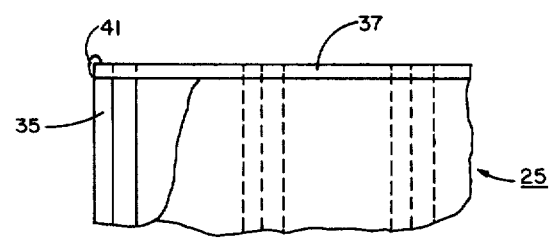
FIG. 4 is a front elevational view of a mirror module similar to FIG. 3 but having a top beam covering the top of the internal support structure.

In the illustrated embodiment of FIGS. 3 and 4, a top member 37 and a bottom member 39 are employed. As illustrated, top and bottom members 37, 39 are formed of sheet metal and also form a box enclosure in combination with the respective front and back sheets and the beams. The top and bottom members 37 and 39 are advantageous in preventing building a bird's nests or the like interiorly of the structure. In addition, the top and bottom members provide strength against flexure.

Vents are preferably employed to alleviate problems with moisture condensation and accumulation.

The result of the structural module is that the predetermined shape, such as flat, is maintained; regardless of temperature change, since the glass mirror and substrate may freely differentially thermally expand or contract without inducing thermal stress or curvature effects such as would be experienced with a rigidly bonded assembly of dissimilar materials.

The mirror 33 is assembled to the front sheet 27 by silicone grease 31. The silicone grease 31 is preferably hydrophobic so as to repel water. Any of the various silicone greases may be employed that have water repellency and have adequate strength to support the mirror, yet have sufficient shear tolerance to permit differential expansion of the mirror and the substrate when the temperature changes without inducing stresses or curvature effects. The silicone grease also is adapted to hold the mirror securely and prevent fluttering of the mirror with respect to the front sheet. In addition, the silicone grease also serves to protect the back side of the mirror against the adverse affects of weathering and condensation of water vapor and prevents the weather from splotching and damaging the mirroring material on the back of the mirror.

Typical of the silicone greases that are employed are those satisfying military specifications MIL S-8660B; for example, dimethyl silicone. A satisfactory commercially available product is Dow Corning's "4 Compound" (a trademark).

If desired, the silicone grease may be supplemented by clips at the respective corners to physically retain edges of the mirror engaging edges of the front plate 27 while allowing a friction slip to accommodate differential expansion. As illustrated, a rubber grommet 41 is employed around the edges of the mirror for a better appearance and to alleviate the problems with water tending to seep between the mirror and the front sheet.

In operation, the mirror is laid face down on a flat, or pre-described curved or canted non-scarring surface. Preferably, jigs are employed to facilitate alignment. A thin, uniform layer of silicone grease is applied to the back of the mirror. For example, a uniform layer 0.001 inch-0.005 inch thick is applied. A thin layer of silicone grease is applied to the front of the front plate. The front plate is carefully applied to the mirror, taking care to eliminate air pockets and the like between the layers of silicone grease. The beams are adhered to the front sheet with the adhesive. The back sheet is also adhered to the beams. Handling brackets 45, FIGS. 5 and 6, or the like can be applied by adhesive, bradding or as desired. The rubber grommet 41 is then emplaced. Respective mirror modules are affixed as by bolts, welding or the like to the main structural members of the main supportive structure. Mainly the supporting structure is attached, as implied heretofore, to the horizontal arms 23 so as to be pivoted with respect to the vertical axis for reflecting the sun onto the collector. Suitable circular pinion gear is employed in conjunction with gear and electric motor to rotate with respect to the vertical axis of the post 19.

As illustrated, the mirror modules are formed in sections of about 4 foot wide by 12 foot long. There are six such modules on each side of the illustrated heliostat so there are a total of 12 such modules. If desired, of course, the mirror modules may be made in other dimensions such as 4 foot by 4 foot, 4 foot by 6 foot, or the like. The modules supporting the mirror may be from 3 to 5 inches or more in thickness depending upon the dimensions of the structural beams 35 employed.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. In a heliostat for reflecting solar energy onto a collector including:
   a. a main support structure;
   b. means for pivoting and tilting said heliostat so as to keep said solar energy focused on said collector, and
   c. a plurality of mirror modules for reflecting said solar energy;

the improvement comprising having each said mirror module thermally stabilized against curvature induced by temperature changes and comprising:
   d. internal support structure having sufficient rigidity to support said mirror cantilevered from said main support structure and to withstand predetermined loads;
   e. front and back sheets attached to said internal support structure; said front and back sheets having the same coefficient of thermal expansion such that no curvature is induced by temperature changes; said front and back sheets having adequate structural strength to stabilize said internal support structure; and
   f. a layer of adhesive grease adhering said mirror to said front sheet; said adhesive grease being water repellant and having adequate set strength to support said mirror and having sufficient shear tolerance to permit differential expansion of said mirror and said front sheet when the temperature changes without inducing stresses or curature effects; said adhesive grease being adapted to prevent fluttering of said mirror with respect to said front sheet and to protect the mirror backside against the adverse effects of weather.

2. The heliostat of claim 1 wherein said internal support structure includes a plurality of beams extending across said mirror.

3. The heliostat of claim 2 wherein said beams extend transversely of said mirror and are formed of the same material as the front and back sheet so as to have the same coefficient of thermal expansion.

4. The heliostat of claim 3 wherein said beams and said front and back sheets are formed of metal selected from the class consisting of aluminum and galvanized steel.

5. The heliostat of claim 2 wherein said internal support structure includes top and bottom enclosing structures enclosing a top and bottom of said beams.

6. The heliostat of claim 2 wherein said beams are Z-beams.

7. The heliostat of claim 2 wherein said beams are C-beams.

8. The heliostat of claim 1 wherein said internal support structure comprises multiple plastic foam beams.

9. The heliostat of claim 1 wherein said internal support structure comprises a single plastic foam slab.

* * * * *